US011500342B2

(12) United States Patent
Laleg et al.

(10) Patent No.: US 11,500,342 B2
(45) Date of Patent: Nov. 15, 2022

(54) ROBUST LYAPUNOV CONTROLLER FOR UNCERTAIN SYSTEMS

(71) Applicant: King Abdullah University of Science and Technology, Thuwal (SA)

(72) Inventors: Taous Meriem Laleg, Thuwal (SA); Shahrazed Elmetennani, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 994 days.

(21) Appl. No.: 15/752,686

(22) PCT Filed: Aug. 13, 2016

(86) PCT No.: PCT/IB2016/054884
§ 371 (c)(1),
(2) Date: Feb. 14, 2018

(87) PCT Pub. No.: WO2017/029600
PCT Pub. Date: Feb. 23, 2017

(65) Prior Publication Data
US 2019/0026644 A1 Jan. 24, 2019

Related U.S. Application Data

(60) Provisional application No. 62/205,631, filed on Aug. 14, 2015.

(51) Int. Cl.
*G05B 13/04* (2006.01)
*G05B 17/02* (2006.01)
*F03G 6/06* (2006.01)

(52) U.S. Cl.
CPC .......... *G05B 13/048* (2013.01); *F03G 6/065* (2013.01); *G05B 17/02* (2013.01); *Y02E 10/46* (2013.01)

(58) Field of Classification Search
CPC ....... G05B 13/048; G05B 17/02; F03G 6/065; Y02E 10/46
(Continued)

(56) References Cited

U.S. PATENT DOCUMENTS

| 6,415,272 B1 * | 7/2002 | Ulyanov | G05B 13/0265 |
| | | | 706/10 |
| 2002/0111758 A1 * | 8/2002 | Wang | G05B 11/42 |
| | | | 702/79 |
| 2010/0268353 A1 * | 10/2010 | Crisalle | G05B 13/048 |
| | | | 700/29 |

FOREIGN PATENT DOCUMENTS

| WO | 01/92974 | 12/2001 | |
| WO | WO-0192974 A2 * | 12/2001 | ........... G05B 13/027 |

OTHER PUBLICATIONS

Costa, Bertinho A., and João M. Lemos. "Temperature control of a solar tower receiver based on the Lyapunov method." 2015 23rd Mediterranean Conference on Control and Automation (MED). IEEE, 2015. pp. 583-588. Published Jul. 16, 2015. (Year: 2015).*

(Continued)

*Primary Examiner* — John E Johansen
(74) *Attorney, Agent, or Firm* — Patent Portfolio Builders PLLC

(57) ABSTRACT

Various examples of systems and methods are provided for Lyapunov control for uncertain systems. In one example, a system includes a process plant and a robust Lyapunov controller configured to control an input of the process plant. The robust Lyapunov controller includes an inner closed loop Lyapunov controller and an outer closed loop error stabilizer. In another example, a method includes monitoring a system output of a process plant; generating an estimated system control input based upon a defined output reference; generating a system control input using the estimated system control input and a compensation term; and adjusting the (Continued)

process plant based upon the system control input to force the system output to track the defined output reference. An inner closed loop Lyapunov controller can generate the estimated system control input and an outer closed loop error stabilizer can generate the system control input.

18 Claims, 10 Drawing Sheets

(58) Field of Classification Search
USPC .......................................................... 703/2
See application file for complete search history.

(56) References Cited

OTHER PUBLICATIONS

Elmetennani, Shahrazed, and Taous Meriem Laleg-Kirati. "New fuzzy approximate model for indirect adaptive control of distributed solar collectors." 2014 IEEE Conference on Evolving and Adaptive Intelligent Systems (EAIS). IEEE, 2014. pp. 1-7. Published Jul. 31, 2014. (Year: 2014).*

International Search Report and Written Opinion for PCT/IB2016/054884, dated Nov. 18, 2016.

Costa, et al., "Temperature Control of a Solar Tower Receiver based on the Lyapunov Method", 2015 23rd Mediterranean Conference on Control and Automation (MED), Jun. 1, 2015, pp. 583-588.

Elmetennani, et al., "Fuzzy Unizersal Model Approximator for Distributed Solar Collector Field Control", 2014 UKACC International Conference on Control (Control), IEEE, Jul. 9, 2014, pp. 203-208.

Elmetennani, et al., "New Fuzzy Appoximate Model for Indirect Adaptive Control of Distributed Solar Collectors", 2014 IEE Conference on Evolving and Adaptive Intelligent Systems (EAIS), IEEE, Jun. 2, 2014, pp. 1-7.

Communication pursuant to Article 94(3) EPC in corresponding/related European Application No. 16760555.9, dated Sep. 3, 2020 (Documents D1, D2 and D3 were provided in the IDS filed Feb. 14, 2018).

* cited by examiner

Parameters of the solar collectors field

| Symbol | Measure unit | Description |
|---|---|---|
| $t$ | $s$ | Time |
| $x$ | $m$ | Space |
| $T(x,t)$ | $°C$ | Fluid temperature |
| $I(t)$ | $W/m^2$ | Solar irradiance |
| $Q(t)$ | $m^3/s$ | Fluid flow rate |
| $\rho$ | $kg\ m^{-3}$ | Fluid density |
| $c$ | $J\ C^{-1}\ kg^{-1}$ | Fluid specific heat capacity |
| $A_s$ | $m^2$ | Cross-sectional area |
| $\nu_0$ | | Mirrors optical efficiency |
| $G$ | $m$ | Mirrors optical aperture |
| $L$ | $m$ | Length of the collector tube |

FIG. 2

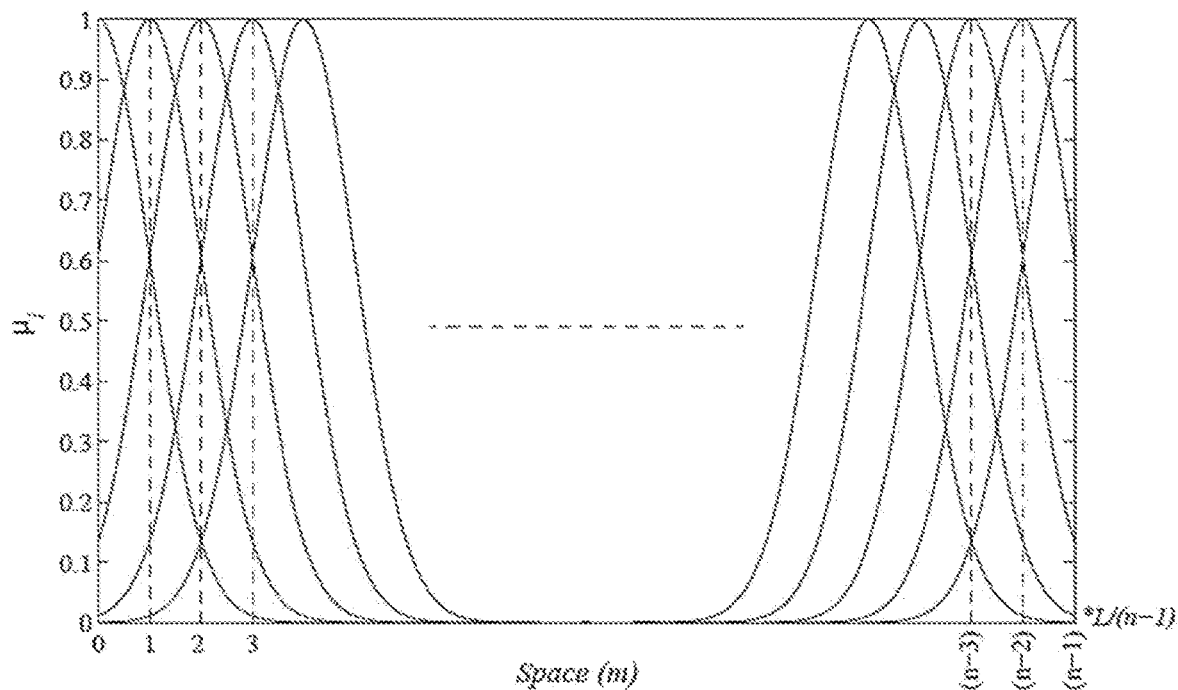

FIG. 3

ROBUST LYAPUNOV CONTROLLER FOR UNCERTAIN SYSTEMS

CROSS REFERENCE TO RELATED APPLICATIONS

This application claims priority to, and the benefit of, co-pending U.S. provisional application entitled "ROBUST LYAPUNOV CONTROLLER FOR UNCERTAIN SYSTEMS" having Ser. No. 62/205,631, filed Aug. 14, 2015, which is hereby incorporated by reference in its entirety.

BACKGROUND

Nowadays, the decrease in fossil resources along with the increase of their environmental impact is driving the interest of public and private sectors in renewable energy to meet the world demand. Indeed, different forms of renewable energy present promising alternative clean sources, as part of them, solar energy. The operation of any solar driven plant is constrained by the availability of the sunlight, which is characterized by its intermittency and unpredictable changes affecting the energy production. Thereafter, in order to better exploit solar energy, research investigations are gradually consolidated, from both technological and control perspectives, in order to enhance the production efficiency. Solar thermal distributed concentrated technology, known for high efficiency with available thermal storage solution, is one of the main researchers' interests.

SUMMARY

Embodiments of the present disclosure are related to Lyapunov control for uncertain systems such as, e.g., parabolic distributed collectors.

In one embodiment, among others, a system comprises a process plant and a robust Lyapunov controller configured to control an input of the process plant. The robust Lyapunov controller comprises an inner closed loop Lyapunov controller and an outer closed loop error stabilizer. In one or more aspects of these embodiments, the process plant can be a distributed solar collector and the input of the process plant is an inlet fluid flow rate. The process plant can comprise a parabolic solar collector.

In one or more aspects of these embodiments, the robust Lyapunov controller can comprise a nominal model of the process plant configured to generate an estimated output based at least in part upon fixed working conditions of the process plant. The nominal model can be a physical distributed model of the process plant. The physical distributed model can be a bilinear model that approximates the process plant by a low order nonlinear set of ordinary differential equations using dynamical Gaussian interpolation.

In one or more aspects of these embodiments, the outer closed loop error stabilizer can be configured to generate the input to force an output of the process plant to track a nominal output using a phenomenological representation of the process plant. The inner closed loop Lyapunov controller can be configured to generate an estimated input based upon an estimated output generated by a nominal model of the process plant and an output reference, the estimated input provided to the outer closed loop error stabilizer and the nominal model of the process plant.

In another embodiment, a method comprises monitoring an output of a process plant; generating an estimated control input based at least in part upon a defined output reference; generating a control input based at least in part upon the estimated control input and a compensation term based upon a phenomenological model of the process plant; and adjusting operation of the process plant based upon the control input to force the output of the process plant to track the defined output reference. An inner closed loop Lyapunov controller can generate the estimated control input and an outer closed loop error stabilizer can generate the control input.

In one or more aspects of these embodiments, the control input can be further based upon a difference between an estimated output and the output being monitored, where the estimated output is based upon a nominal model of the process plant and the estimated control input. The nominal model can be a physical distributed model of the process plant. The physical distributed model can be a bilinear model that approximates the process plant by a low order nonlinear set of ordinary differential equations using dynamical Gaussian interpolation.

In one or more aspects of these embodiments, the control input can be further based upon time varying weighting parameters provided by the nominal model. The compensation term can be determined based upon the control input and a rate of change of the output. The process plant is a distributed solar collector and the input of the process plant is an inlet fluid flow rate.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 includes a table of system parameters of a solar collector in accordance with various embodiments of the present disclosure.

FIG. 3 is an example of radial basis functions distributed along a solar collector in accordance with various embodiments of the present disclosure.

DETAILED DESCRIPTION

Figure 1A:
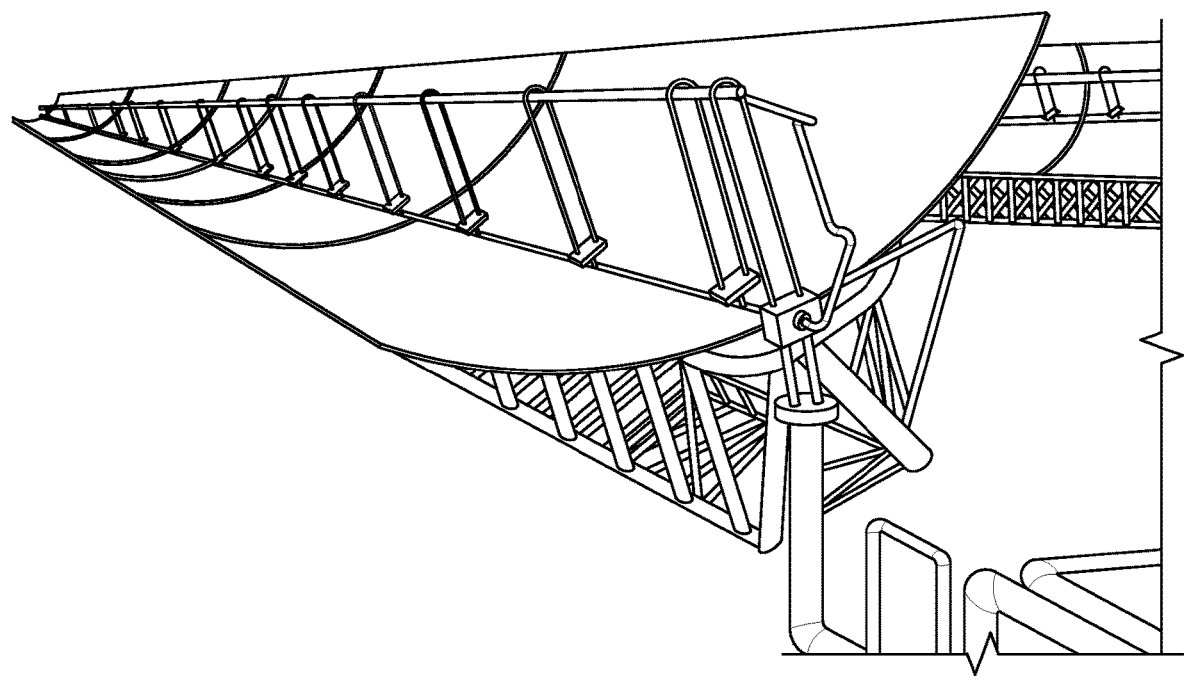
FIGS. 1A and 1B illustrate an example of a parabolic solar collector in accordance with various embodiments of the present disclosure.

Disclosed herein are various embodiments of methods related to Lyapunov control for uncertain systems such as, e.g., parabolic distributed collectors. Reference will now be made in detail to the description of the embodiments as illustrated in the drawings, wherein like reference numbers indicate like parts throughout the several views.

The parabolic distributed technology, in particular, is widely used to feed solar thermal processes. The parabolic troughs are spatio-temporal distributed systems working based on a heat transfer mechanism where the parabolic shaped mirrors concentrate the received solar irradiance to a receiver tube in order to heat the thermal carrier fluid flowing through it. Moreover, considering that the solar collector is subject to various random external disturbances, the system time varying dynamics are rich enough to present difficulties for control design. In addition, the annual pluvial cycles, the humidity levels and the dust accumulation modify considerably the reflectivity of the mirrors, adding challenges for efficient control schemes. Therefore, the design of advanced control strategies able to reject unevenly distributed solar irradiance and to cope for the time delays related to transport phenomena is desired.

The control problem generally addressed in solar plants using parabolic shaped collectors aims at forcing the field outlet temperature to track a set reference in order to manage the heat production. The objective is to design an efficient controller able to maintain the desired fluid outlet temperature despite disturbances in irradiation and system parameters, by tuning the inlet fluid flow rate as a control input. To deal with this problem, the control design has been approached by means of many different techniques (conventional feedback control, model predictive control, adaptive control, internal model control, fuzzy control, or more complex control strategies). Developed control techniques can be applied to distributed concentrated collectors. Control techniques can really enhance the performance of solar thermal power plants. Indeed, developing advanced control strategies for the parabolic troughs fields continues to be a challenge to control theory, especially that these plants are representative of a wider category of thermal processes working based on a one dimensional heat conduction mechanism.

A well designed control system for solar plants should be able to minimize the problems related to the solar irradiation intermittency for a more efficient functioning. The estimation of the efficient value of the source term has been used as a solution to continuously update the controller in order to compensate for the external disturbances. Numerous control techniques have been combined with estimation or identification methodologies such as the indirect adaptive control, model predictive control, adaptive fuzzy switching control techniques or more advanced adaptive techniques. Moreover, to reduce the impact of disturbances, feedforward control can be efficient.

Measurable disturbances can be utilized to implement a feedforward controller, which are based upon reliable measurements of the external perturbations. In commercial solar systems not all variables and parameters are monitored by direct measurements, since some of them may be technically difficult or expensive to measure. While reflectometers and pyheliometers offer local measurements, it is difficult to obtain an adequate estimation of metal tubes absorptance and other unknown factors. Thereafter, for more efficient control of the system without additional computational effort for the estimation of the source term, the design of a robust control law with respect to the varying system parameters and external disturbances is a judicious choice. The parabolic trough solar collector is a distributed nonlinear constrained system. Several techniques presented in the literature are designed assuming the plant to be modeled as a black box lumped parameters system. Due to the wide operating range of solar collector plants, the linear models are in general affected by a significant parametric uncertainty.

Consideration of a distributed physical model for the control design can improve their performance. In addition to the distributed system dynamics, the system is nonlinear with respect to the control input and can be characterized by a randomly varying source term. Therefore, numerical schemes can be applied on the hyperbolic heat transport equation, while preserving the distributed nature of the dynamics, in order to derive a set of ordinary differential equations (ODEs) to be used for system analysis and/or control design. To reproduce the system dynamics accurately, a high number of knots in the computational grid may be needed which could increase the computational effort and complicate the control design. In this respect, an approximate bilinear model can be utilized. The hyperbolic distributed model of the parabolic troughs can be approximated by a low order nonlinear set of ODEs using dynamical Gaussian interpolation. The resulting model takes the form of a reduced order bilinear state space representation, which can be used as a basis for the robust control design.

In the present disclosure, a robust nonlinear output feedback control is developed for reference tracking of the desired temperature level. The design combines Lyapunov state feedback with a phenomenological representation of the plant to force the measured outlet temperature to track the desired reference while compensating for the variations of the external perturbations. Indeed, using the bilinear system model, a state feedback control has been developed resorting to Lyapunov stability theory to stabilize the tracking error for nominal working conditions. A phenomenological representation has been considered to describe the system behavior taking into account the uncertainty and the external disturbances in the plant. A robust control law can be established in order to force the system dynamics to follow the nominal behavior using the phenomenological model.

Knowing that the nominal system is controlled using the inner loop to track the predefined reference, the designed control will implicitly maintain the system output around the desired temperature level. Simulation tests have proven that the presented control strategy achieves the control objective while ensuring robustness with respect to external disturbances, model uncertainties, and system aging without the need to measure the external perturbations or to estimate their efficient values. Convergence of the closed loop control has been proven using the distributed parameters model of the ACUREX field.

Description of the Plant

Figure 1B:
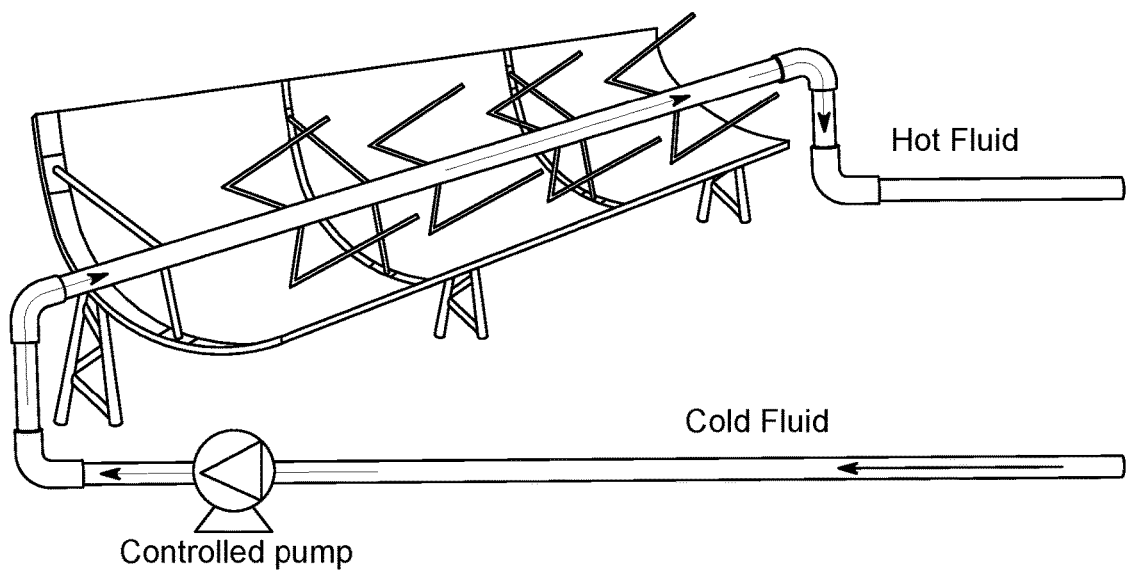

A concentrated parabolic solar collector is a spatially distributed industrial system working based on a heat transfer mechanism. It includes a set of parabolic mirrors concentrating the sunlight to heat a fluid in a central pipe of the collector, which is routed to feed a thermal process. Referring to FIG. 1A, shown is an image providing an overall view of one line concentrated solar collector of a distributed solar collector. FIG. 1B is a schematic diagram illustrating the radiation reflected on the concentrated solar collector.

Based on an energy analysis, while neglecting the heat losses and the thermal exchanges between the tube and the fluid, the heat transfer along the solar collector can be modeled by a hyperbolic partial differential equation where the fluid temperature is the system state:

$$\begin{cases} T_t(x,t) + u(t)T_x(x,t) = s(x,t), \\ T(0,t) = T_{in}(t), \\ T(L,t) = T_{out}(t) = y(t), \end{cases} \quad (1)$$

for $x \in [0, L]$ to denote the position along the pipe and $t \in \mathbb{R}^+$ to represent the time. T(x, t) refers to the fluid temperature at a certain position x and time t, where:

$$T_t(x,t) \equiv \frac{\partial T(x,t)}{\partial t} \text{ and } T_x(x,t) \equiv \frac{\partial T(x,t)}{\partial x}$$

are the first derivatives with respect to time and space, respectively. The source term s(x, t) depends on the solar irradiance I(x, t) and the system control input u(t), which is a function of the fluid volumetric flow rate Q(t), can be expressed respectively as:

$$s(x,t) = \frac{v_0 G}{\rho c A_s} \text{ and } u(t) = \frac{Q(t)}{A_s}.$$

Besides, $T_{in}$ and $T_{out}$ denote the measured boundary values of the fluid temperature, respectively, at the positions x=0 and x=L. The remaining system parameters are summarized in the table of FIG. 2.

Bilinear Approximate Model of the Solar Collector

Model Approximation.

The procedure to approximate the first order hyperbolic distributed model of the solar collector by a low dimensional bilinear state space representation will now be discussed. A scheme to obtain numerical solutions for partial differential equations (PDEs) is discussed in "Multiquarics—a scattered data approximation scheme with applications to computational fluid-dynamics" by E. J. Kansa (*Computers Math. Applic.*, vol. 19, no. 8/9, pp. 147-161, 1990), which is hereby incorporated by reference in its entirety. A dynamical version of this approach can be used to reproduce the temperature dynamics. Thereafter, the overall approximate output at each position x along the collector can be interpolated using radial basis functions defining the n sets $D_i$ for i={1, . . . , n} using time varying weighting parameters $\xi_i(t)$. Thus, the approximate value of the temperature $\hat{T}(x, t)$ can be given by:

$$\hat{T}(x,t) = \sum_{i=1}^{n} \xi_i(t)\gamma_i(x) = \gamma^T(x)\xi(t), \quad (2)$$

for i={1, . . . , n} with $\xi(t) \in \mathbb{R}^n$ is the set of weighting parameters such that $\xi(t)=[\xi_1(t), \ldots, \xi_n(t)]^T$ and $\gamma(x)=[\gamma_1(x), \ldots, \gamma_n(x)]^T$, where $$\gamma_i(x) = \frac{\mu_i(x)}{\sum_{k=1}^{n} \mu_k(x)}. \quad (3)$$

The radial basis functions $\mu_i$ characterize the n sets of $D_i$, which subdivide the space [0, L], in terms of the spatial coordinates, such that:

$$D_i = \{(x, \mu_i(x)) | x \in [0, L]\}, i = \{1, \ldots, n\}. \quad (4)$$

The radial basis functions can be chosen to have Gaussian distributions centered around n equidistant points along the spatial domain, where they are expressed in terms of the spatial positions as follows:

$$\mu_i(x) = \exp\left(\frac{1}{2}\left(\frac{x-a_i}{\sigma_i}\right)^2\right), \quad (5)$$

where $a_i$ and $\sigma_i$ are the mean value and the standard deviation of the Gaussian function corresponding to the $i^{th}$ set, such that for i={1, . . . , n}:

$$a_i = (i-1)\frac{L}{(n-1)} \text{ and } \sigma_i = \sigma = \frac{L}{(n-1)}. \quad (6)$$

Referring to FIG. 3, shown is an example of the distribution of the radial basis functions along the collector.

Substituting the approximate solution $\hat{T}(x, t)$ in the physical distributed model of equation (1) leads to:

$$\gamma(x)^T \dot{\xi}(t) + u(t)\xi^T(t)\gamma_x(x) = s(x,t), \quad (7)$$

and $$\hat{T}(0,t) = \gamma^T(0)\xi(t) = T_{in}(t). \quad (8)$$

Thus, evaluating equation (7) at p different equidistant knots constituting a one dimensional grid in the domain of [0, L], one obtains:

$$\Gamma \dot{\xi}(t) + \Gamma_x \xi(t) u(t) = S(t), \quad (9)$$

such that:

$$\Gamma = \begin{bmatrix} \gamma_1(0) & \cdots & \gamma_n(0) \\ \gamma_1(\Delta x) & \cdots & \gamma_n(\Delta x) \\ \vdots & & \vdots \\ \gamma_1(j) & \cdots & \gamma_n(j) \\ \vdots & & \vdots \\ \gamma_1(L) & \cdots & \gamma_n(L) \end{bmatrix}_{p \times n},$$

-continued $$\Gamma_x = \begin{bmatrix} \gamma_{x1}(0) & \cdots & \gamma_{xn}(0) \\ \gamma_{x1}(\Delta x) & \cdots & \gamma_{xn}(\Delta x) \\ \vdots & & \vdots \\ \gamma_{x1}(j) & \cdots & \gamma_{xn}(j) \\ \vdots & & \vdots \\ \gamma_{x1}(L) & \cdots & \gamma_{xn}(L) \end{bmatrix}_{p \times n},$$

$$S(t) = \begin{bmatrix} s(0, t) \\ \vdots \\ s(j, t) \\ s(j + \Delta x, t) \\ \vdots \\ s(L, t) \end{bmatrix}_{p \times 1}, \text{ and } \gamma_{xi}(x) = \frac{\partial \gamma_i(x)}{\partial x},$$

for $j = \{0, \Delta x, 2\Delta x, \ldots, (p-2)\Delta x, L\}$ with $\Delta x = \dfrac{L}{p-1}$.

Subsequently, the time evolution of the parameters $\xi(t)$ is given by minimization of the approximation error of the system of equation (9) in a least squares sense in order to ensure that the approximation is accurately reproducing the distributed behavior of the temperature given by equation (1). Therefore, the values of the parameters $\xi(t)$ are defined by the following control affine state space representation, which describes the dynamics of the parabolic solar collector, such that:

$$\begin{cases} \dot{\xi}(t) = A\xi(t) \ u(t) + B(t), \\ y(t) = C\xi(t), \end{cases} \quad (10)$$

where $A_{n \times n} = -(\Gamma^T \Gamma)^{-1} \Gamma^T \Gamma_x$ and $B_{n \times 1}(t) = (\Gamma^T \Gamma)^{-1} \Gamma^T S(t)^i$. The system output representing the outlet fluid temperature is given by:

$$y(t) = C\xi(t) = T(L, t) \text{ with } C_{1 \times n} = [\gamma_1(L) \ldots \gamma_n(L)].$$

It is worth to point out that the system order is equal to the number of input sets n<p, which is generally less than ten (10). Moreover, this state dimension is relatively small compared to other numerical schemes, particularly the semi-discretization which usually uses a high state dimension in order to ensure the accuracy of the approximation.

The approximate model has been defined using a basis of eight Gaussian functions resulting in a state vector of dimension n=8 approximated on a grid of p=500 knots along the collector tube to construct the matrices $\Gamma$ and $\Gamma_x$ of dimension 8×500. It has been shown that increasing the number of sets utilizes more computational effort without a significant improvement in the performance. The standard deviation has been chosen equal to $\sigma=L/(n-1)$. The procedure of the modified Gaussian interpolation applied for approximation of the solar collector model can be enhanced with a complete numerical analysis and performance evaluation.

Model Validation.

The bilinear model of equation (10) for the parabolic distributed solar collector can be validated by comparison to the analytical solution of the physical model of equation (1). Knowing that (x, t) lies in the upper half-plane $\mathbb{R}^{2+} := (-\infty, \infty) \times [0, \infty)$, the unknown is $T: \mathbb{R}^{2+} \to \mathbb{R}$ and $u: \mathbb{R}^+ \to \mathbb{R}$ is a continuous function that is sufficiently smooth, the analytical solution of the hyperbolic partial differential equation describing the heat transfer dynamics along the solar collector takes the form of:

$$\begin{cases} \text{if } x - \int_0^t u(\tau)d\tau \geq 0: \\ T(x, t) = T\left(x - \int_0^t u(\tau)d\tau, 0\right) + \int_0^t s(\tau)d\tau, \\ \text{else if } x - \int_0^t u(\tau)d\tau < 0: \\ T(x, t) = T(0, t^*) + \int_{t^*}^t s(\tau)d\tau, \text{ where } \int_{t^*}^t u(\tau)d\tau = x. \end{cases} \quad (11)$$

Figure 4:
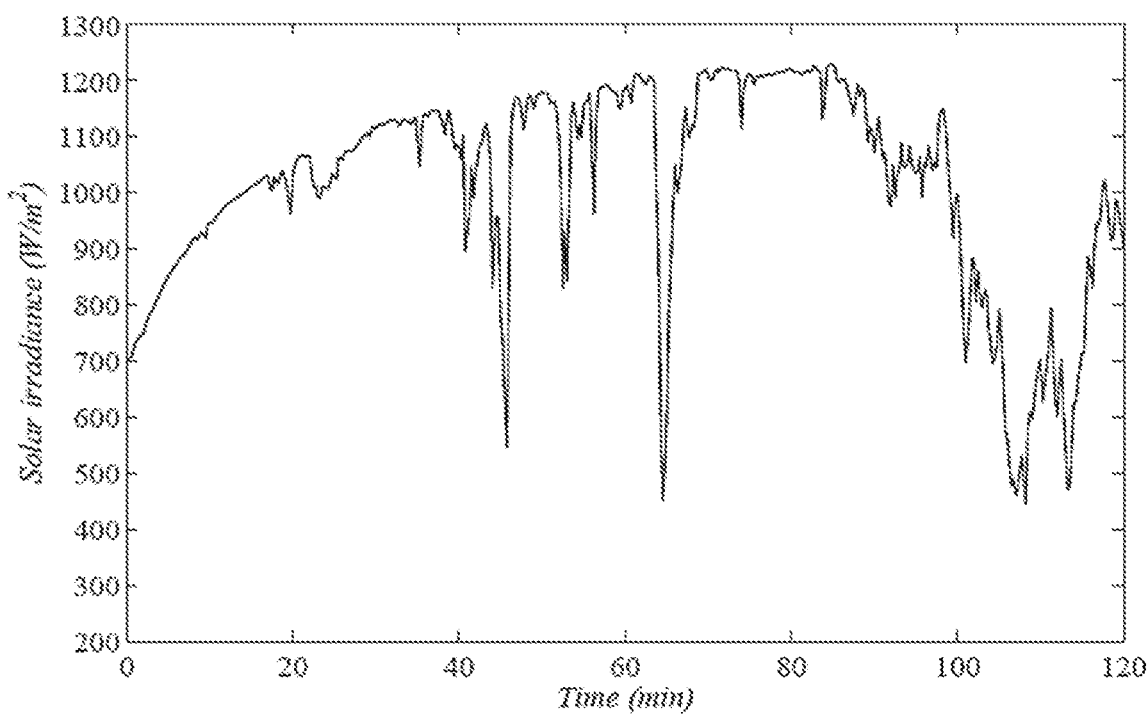
FIG. 4 is an example of a solar irradiance profile in accordance with various embodiments of the present disclosure.
Figure 5:
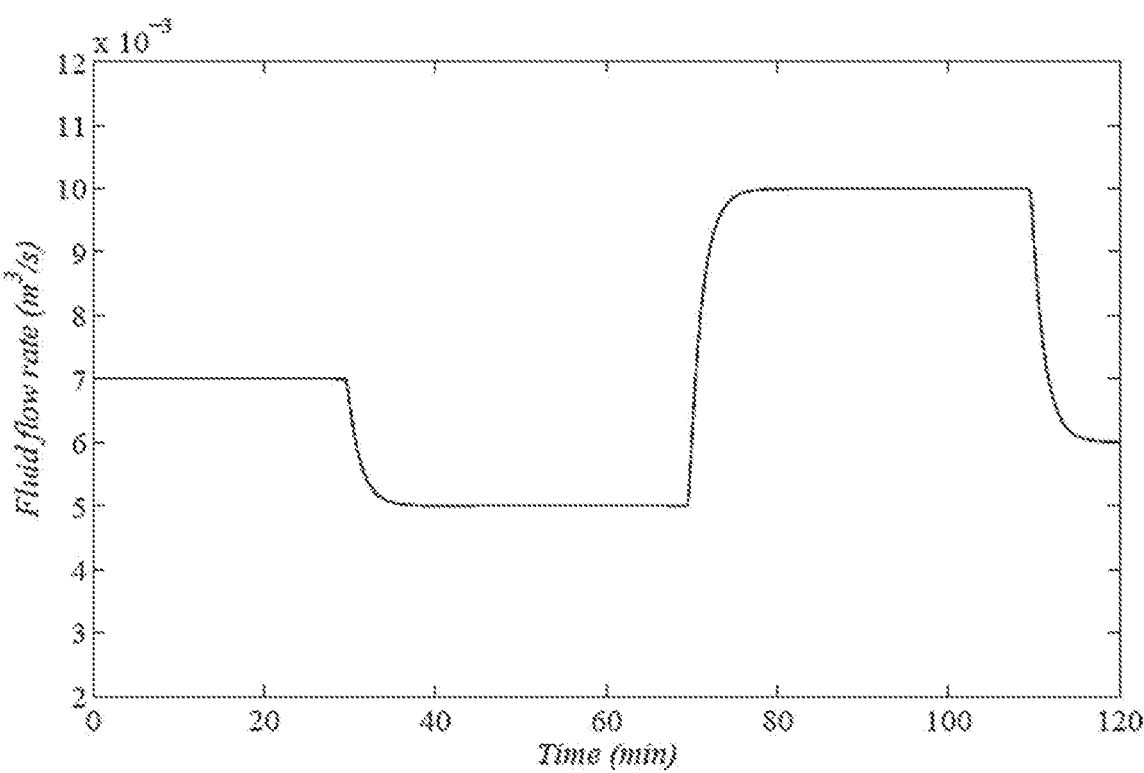
FIG. 5 is an example of a fluid flow rate profile of a solar collector in accordance with various embodiments of the present disclosure.

The parameters of the ACUREX field Plataforma Solar de Almeria were used to run a validation test of the reduced model of equation (10). The ACUREX field can be considered to be a typical test bed for the concentrated distributed technology. The approximate model was defined using a basis of eight Gaussian functions (n=8) and a grid of 500 knots along the collector tube to construct the matrices $\Gamma$ and $\Gamma_x$. The test was carried out for two (2) hours under a varying irradiance profile comprising favorable working conditions and abrupt changes in the radiation level. FIG. 4 illustrates the profile of the solar irradiance during the test. The model was also tested for different transfer velocities. The fluid volumetric flow rate was changed between different ranges within admissible physical limits as illustrated by the profile of the fluid flow rate in FIG. 5. The time evolution of the temperature was computed at different positions along the collector (L/5, 2L/5, 3L/5, 4L/5, L). The obtained results were compared to the corresponding analytical solutions of the hyperbolic heat transport equation.

Figure 6:
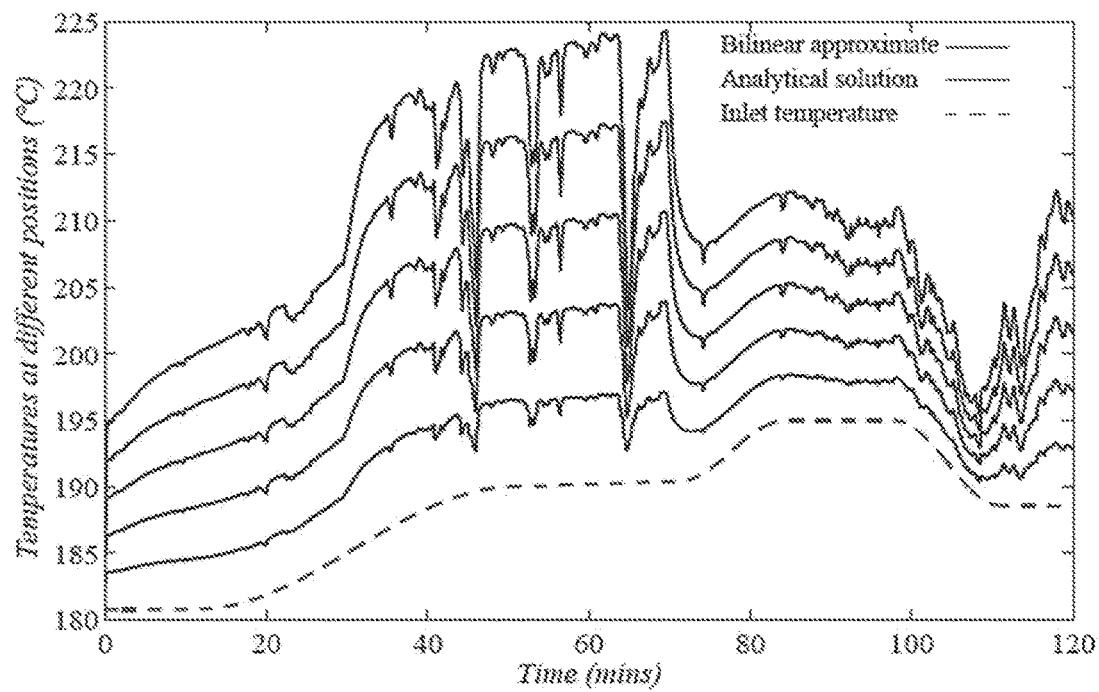
FIG. 6 includes examples of the temperature dynamics of the solar collector in accordance with various embodiments of the present disclosure.
Figure 7:
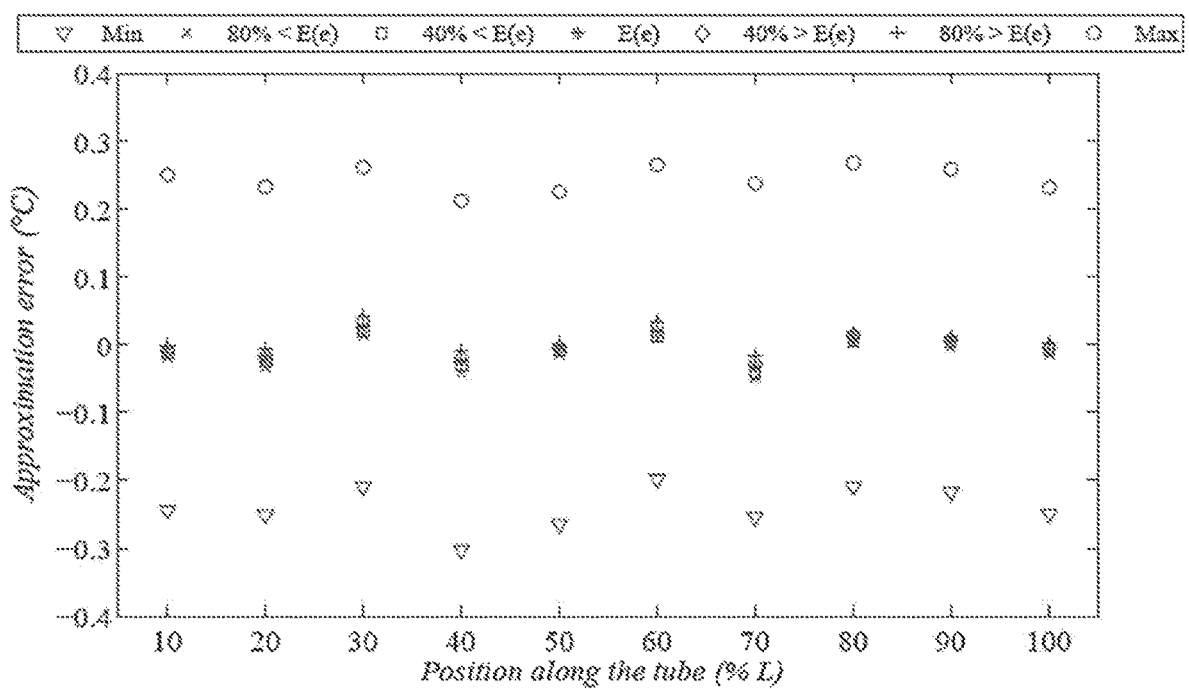
FIGS. 7 and 8 graphically illustrate approximation error of a bilinear model in accordance with various embodiments of the present disclosure.
Figure 8:
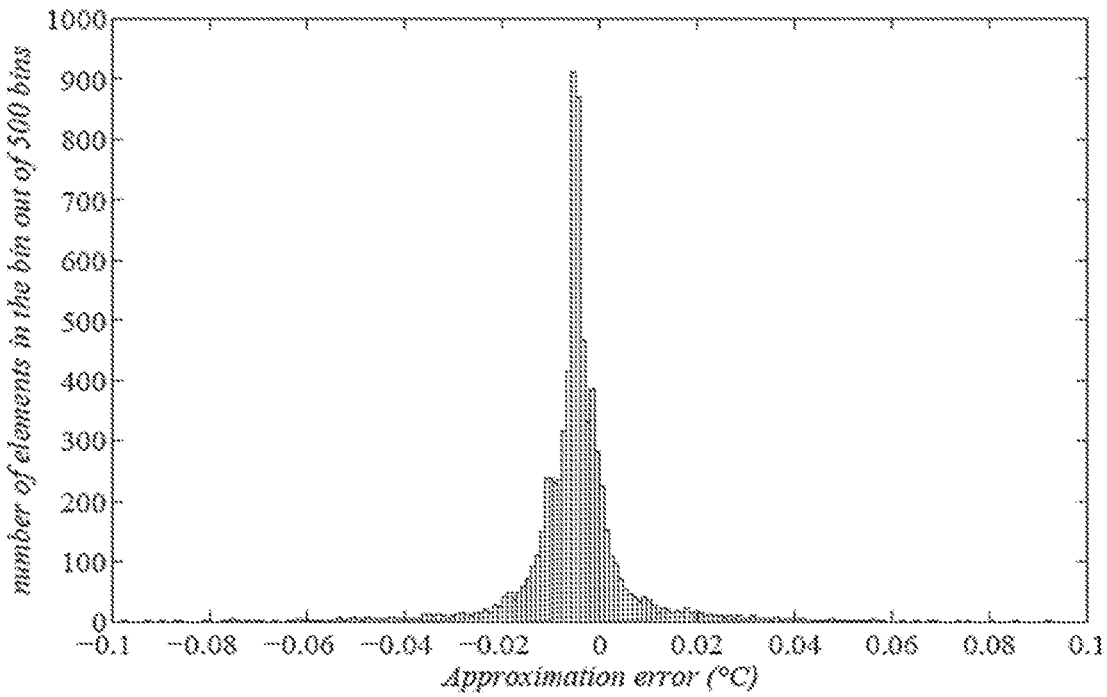

Referring now to FIG. 6, shown are examples of the temperature dynamics (evolution) along the collector. The generated numerical approximations correlate with the analytical solutions and the thermal dynamics along the collector are well reproduced using the bilinear reduced model. In order to evaluate the accuracy level of the bilinear model of equation (10), a graphical analysis of the approximation error was performed and the results illustrated in FIG. 7. A histogram of the approximation error at the outlet position is provided in FIG. 8. It can be observed that the generated error lies in the interval ([−0.3, 0.3]) which is an acceptable error comprised by the reduction of the computational effort. Moreover, for a (60%) percentile, the error density is concentrated in the neighborhood of zero bounded by (±0.05). Therefore, it can be concluded that the bilinear approximate model presents satisfactory results and proves its accuracy in approximating the behavior of the distributed solar collector. Moreover, the low dimension of the resulting state representation makes it suitable for real time implementation for analysis and/or control purposes.

Robust Lyapunov Controller

A robust controller can be utilized to stabilize the closed loop system forcing the field temperature output to track a predefined reference despite the changes in the external disturbances without reliance on the measurements. A reference tracking problem can be formulated as two embedded error stabilization problems. The inner closed loop can be designed for the stabilization of the nominal tracking error resorting to Lyapunov control theory to maintain the outlet temperature of the nominal system around a desired level. Nominal refers to the dynamics of the system for fixed working conditions, which can be used as a reference for the system perturbations and parameters uncertainties. The outer closed loop can be used to force the system output to track the nominal output using a phenomenological definition of the system dynamics. By stabilizing the error dynamics between the system output and the nominal output, the system output follows the output of the nominal system that is controlled to track the desired reference. Consequently, the control objective can be achieved.

When modeling concentrating solar power plants, the most common approach is to assume that all field equipment behaves similarly. Indeed, the model presented in equation (1) has been used considering a homogeneous source term along the solar field in order to simplify the control design. However, under external working conditions, the effective solar irradiance and/or the mirrors efficiency can be only locally evaluated especially for large production fields. Thus, the extrapolation of the local measurements is not a reasonable assumption given the natural variations. Indeed, scattered clouds may only affect the location of the measurement position while the rest of the pipe may be under the effect of direct solar radiation, or vice versa. In addition, the mirrors optical efficiency can generally vary over time and can be inhomogeneous in space especially in a dusty humid environment. In order to design the robust controller, general working conditions of the system where the source term is defined as a spatio-temporal function are considered.

Consequently, the source term can be defined by:

$$s_g(x, t) = \frac{v_0(x, t)G}{\rho c A_s} I(x, t), \qquad (12)$$

and can take the following form on the computational grid:

$$S_g(t) = \frac{v_0(x, t)G}{\rho c A_s} I(x, t) = \begin{bmatrix} s(0, t) \\ \vdots \\ s(k, t) \\ s(k + \Delta x, t) \\ \vdots \\ s(L, t) \end{bmatrix}_{p \times 1}, \qquad (13)$$

for k={0, $\Delta x$, $2\Delta x$ ..., L} and $\Delta x = L/p-1$. Therefore, the system can be modeled by:

$$\begin{cases} \dot{\xi}(t) = A\xi(t)\, u(t) + B_g(t), \\ y(t) = C\xi(t), \end{cases} \qquad (14)$$

with $$B_g(t) = (\Gamma^\top \Gamma)^{-1} \Gamma^\top S_g(t). \qquad (15)$$

A nominal representation for the state space model of equation (10) can be defined as:

$$\begin{cases} \dot{\overline{\xi}}(t) = A\overline{\xi}(t)\, \overline{u}(t) + \overline{B}, \\ \overline{y}(t) = C\overline{\xi}(t), \end{cases} \qquad (16)$$

with $$\overline{B} = (\Gamma^\top \Gamma)^{-1} \Gamma^\top \overline{S}, \qquad (17)$$

such that:

$$\overline{S} = \frac{\overline{v_0} G}{\rho c A_s} \overline{I} 1_{p \times 1}. \qquad (18)$$

where $\overline{v_0}=1$ and $\overline{I}=750$ W/m². $\overline{\xi}$ and $\overline{y}$ denote the state and the output of the nominal model, respectively, describing the dynamics of the system under the nominal conditions of equation (18), and the unit vector of dimension (p×1) is denoted by $1_{p \times 1}$.

Proposition 1.

Consider a system governed by the state representation of equation (10) and subjected to the unknown bounded disturbances S(t). The system is characterized by a nominal representation defined by equation (16) and a phenomenological model given by:

$$\dot{y}(t) = F(t) + \alpha u(t), \qquad (19)$$

where a ∈ $\mathbb{R}$ is a "non-physical" constant parameter for scaling; and

F is the compensation term, which carries the unknown and/or nonlinear dynamics of the system as well as the varying external disturbances.

Proof.

Proposition 1 introduces a phenomenological model representing the system dynamics with a linear expression of first order. This representation approximates correctly the heat transport since the state space representation of equation (10) is of relative degree one. Indeed, by computing the Lie derivative of the output vector field $C\xi(t)$ with respect to the input vector field $A\xi(t)$, the following can be obtained:

$$\frac{\partial}{\partial \xi}(C\xi(t)) A\xi(t) = CA\xi(t) \neq 0,$$

which yields the relative degree of the system r=1. Therefore, the system output can be approximated by:

$$\dot{y} = \frac{\partial}{\partial \xi}(C\xi(t))[B(t) + A\xi(t)u(t)] = CB(t) + CA\xi(t)u(t).$$

From this output $\dot{y}$, the system dynamics can be described by:

$$\dot{y}(t) = F(t) + \alpha u(t), \qquad (19)$$

where $\alpha = CA\xi(t)|_{\xi_0}$ and the additive term F(t) stands to represent the linearized dynamics, the external disturbances and the linearization uncertainties. Therefore, Proposition 1 holds for the system of equation (10).

The objective of the inner loop is to force the output of the nominal system to track the desired reference. The tracking reference problem of the nominal system is reduced to a study of the stabilizability of the tracking error where the system external disturbances are assumed to be constant and equal to the nominal values as defined previously. The issue under consideration is that of finding a control Lyapunov function (CLF) for the stabilization of the tracking error around the origin. Consequently, the corresponding feedback control will force the system nominal output to track the desired reference.

Proposition 2.

Consider a system governed by the state representation of equation (16). Given a continuous state feedback control:

$$\overline{u}(t) = \frac{-K\overline{e}(t) + \dot{y}_r(t) - C\overline{B}}{CA\overline{\xi}(t)}, \qquad (20)$$

the nominal tracking error can be defined by:

$$\bar{e}(t)=C\bar{\xi}(t)-y_r(t), \quad (21)$$

exhibits asymptotic convergence to the origin such that:

$$\lim_{t\to\infty}|\bar{e}(t)|=0, \quad (22)$$

by considering the following Lyapunov function:

$$V:\mathbb{R}\to\mathbb{R}^+ \quad (23)$$

$$V(\bar{e})=\frac{1}{2}\bar{e}^\top \bar{e}=(C\bar{\xi}-y_r)^\top(C\bar{\xi}-y_r),$$

where $K \in \mathbb{R}^+$ is a positive constant.
Proof.
To prove that Proposition 2 holds for the system of equation (16), consider the tracking error defined in equation (21). The error dynamics can be expressed as:

$$\dot{\bar{e}}=C\dot{\bar{\xi}}-\dot{y}_r=C[A\bar{\xi}(t)\bar{u}(t)+\bar{B}]-\dot{y}_r. \quad (24)$$

Resorting to Lyapunov nonlinear theory with the Lyapunov function of equation (23), the stability of the unique equilibrium point $\bar{e}=0$ of the error dynamics of equation (24) is analyzed. From (23), the derivative of the Lyapunov function is expressed as:

$$\dot{V}=\bar{e}(t)\dot{\bar{e}}(t)=(CA\bar{\xi}(t)\bar{u}(t)+C\bar{B}-\dot{y}_r(t))\bar{e}(t). \quad (25)$$

The dynamics of the error $\bar{e}$ around its equilibrium point are stabilized when the derivative function $\dot{V}$ is negative definite. The objective is to find the adequate control input $\bar{u}(t)$ within the possible control inputs set to satisfy this condition.

Without loss of generality, impose that $\dot{V}$ takes the form:

$$\dot{V}=-\overline{K}\bar{e}(t)\bar{e}(t) \quad (26)$$

which is negative definite as $\overline{K} \in \mathbb{R}^+$ is a positive constant. $\overline{K}$ is a parameter to be tuned to control the transient behavior of the system while respecting the physical limitations of the system. After that, the control input can be deduced such that:

$$\dot{V}=(CA\bar{\xi}(t)\bar{u}(t)+C\bar{B}-\dot{y}_r(t))\bar{e}(t)=-\overline{K}\bar{e}(t)\bar{e}(t). \quad (27)$$

$$\text{Hence, } \bar{u}(t)=\frac{-\overline{K}\bar{e}(t)-C\bar{B}+\dot{y}_r(t)}{CA\bar{\xi}(t)}. \quad (28)$$

Substituting the control law of equation (28) in equation (25), the derivative of the Lyapunov function of equation (23) is effectively negative definite. Therefore, Proposition 2 holds for the system of equation (16).
Proposition 3.
Assume that Proposition 1 holds for the nonlinear model defined by equation (10). Then, the tracking error between the measured output and the desired reference is stabilized by the control input given by:

$$u(t)=\frac{1}{\alpha}\left[-F(t)+CA\bar{\xi}(t)\bar{u}(t)+C\bar{B}+\underline{K}(\bar{y}(t)-y(t))\right], \quad (29)$$

where $\underline{K}\in \mathbb{R}^+$ is a positive constant. Consequently, the tracking reference closed loop system presented in FIG. 9 exhibits an asymptotic reference tracking. The robust controller 900 includes an inner loop Lyapunov controller 903, an outer loop error stabilizer 906 and a nominal model 909 of the process plant 912.
Proof.
Taking into consideration that Proposition 1 holds for the system of equation (10) and Proposition 2 holds for its nominal representation of equation (16), the stabilizability of the closed loop tracking error can be defined by:

$$\begin{aligned} e(t) &= y(t)-y_r(t), \\ &= y(t)-\bar{y}(t)+\bar{y}(t)-y_r(t) \\ &= \underline{e}(t)+\bar{e}(t), \end{aligned} \quad (30)$$

where the difference between the nominal output and the real measured system output is defined by the error $\underline{e}(t)$ such that:

$$\underline{e}(t)=\bar{y}(t)-y(t).$$

Consequently, the error dynamics under consideration are given by:

$$\dot{e}(t)=\dot{\underline{e}}(t)+\dot{\bar{e}}(t). \quad (31)$$

From Proposition 2, the error $\bar{e}(t)$ is stabilized by $\bar{u}(t)$ defined by equation (20). Therefore, to prove the convergence of the error $\underline{e}(t)$ in order to ensure the stability of the global closed loop error $e(t)$ defined by equation (30). The objective is to stabilize $\underline{e}(t)$ in order to have the system output $y(t)$ tracking $\bar{y}(t)$ and consequently tracking the reference $y_r(t)$. Thus, the goal is to have:

$$\dot{\underline{e}}(t)+\underline{K}\underline{e}(t)=\bar{y}(t)-\dot{y}(t)+\underline{K}(\bar{y}(t)-y(t))=0, \quad (32)$$

where $\underline{K}$ is a positive constant managing the rate of convergence of the error. Without loss of generality, consider $K=\underline{K}=\overline{K}$. The output $y(t)$ is measured and $\bar{y}(t)$ is computed using equation (16). Moreover, $$\dot{\bar{y}}(t)=CA\bar{\xi}(t)\bar{u}(t)+C\bar{B}, \quad (33)$$

and $$\dot{y}(t)=CA\xi(t)u(t)+CB(t). \quad (34)$$

However, the values of $B(t)$ and $\xi(t)$ are not available to define the relationship between $\dot{y}(t)$ and the input $u(t)$. To overcome this problem, the phenomenological formulation defined in equation (19) can be used to describe the output variations in terms of the control input: Therefore, substituting equations (19) and (33) in equation (32) yields:

$$u(t)=\frac{1}{\alpha}\left[-F(t)+CA\bar{\xi}(t)\bar{u}(t)+C\bar{B}+\underline{K}(\bar{y}(t)-y(t))\right], \quad (35)$$

where $\bar{u}(t)$ is defined by equation (20).
The control law of equation (35) depends explicitly on $F(t)$, which is continuously updated based on equation (19) as follows:

$$F(t)=\dot{\hat{y}}(t)-\alpha u(t-t_w), \quad (36)$$

The term $\dot{\hat{y}}(t)$ represents the estimated value of the time derivative of the system output $\dot{y}(t)$, which is numerically updated using a receding horizon algebraic derivative estimator, and $t_w$ denotes the window width of the receding horizon strategy. The algebraic derivative estimation based on the receding horizon approach has proven its efficiency in estimating the time derivative of sampled, noisy time signals.

In this study, the first time derivative of the system output $\dot{y}(t)$ was estimated considering a Taylor-series expansion of order N=2 using the algebraic estimator, such that:

$$\dot{\hat{y}}(t) = \int_0^{\tau_w} \frac{180\tau^2 - 192\tau t_w + 36 t_w^2}{t_w^4} y(t - t_w) d\tau, \quad (37)$$

Substituting equation (36) in equation (37), the control input is given by:

$$\alpha u(t) = -F(t) + CA\bar{\xi}(t)\bar{u}(t) + CB + K(\bar{y}(t) - y(t)), \quad (38)$$
$$= -\dot{\hat{y}}(t) + \alpha u(t - t_w) - K\bar{e}(t) + \dot{y}_r(t) + K(\bar{y}(t) - y(t)),$$
$$= -\dot{\hat{y}}(t) + \alpha u(t - t_w) + \dot{y}_r(t) + K(y_r(t) - y(t)).$$

Considering that the algebraic estimator reproduces correctly the derivative of the measured output and converges faster than the system dynamics, it can be concluded that the estimation error is bounded such that:

$$|\dot{y}(t)-\dot{\hat{y}}(t)|=|\theta(t)|\le\bar{\theta}, \bar{\theta}\in \mathbb{R}^+. \quad (39)$$

Therefore, equation (38) can be rewritten as:

$$\alpha u(t)=-\dot{y}(t)+\alpha u(t-t_w)+\dot{y}_r(t)+K(y_r(t)-y(t))+\theta(t). \quad (40)$$

From equation (40), the tracking error dynamics are given by:

$$\dot{e} + Ke = \alpha(u(t) - u(t - t_w)) - \theta(t) \quad (41)$$
$$= \alpha\Delta u(t) - \theta(t).$$

Therefore, $$e(t) = \exp\left(-\int_0^t K d\tau\right)\left[\int_0^t \exp\left(\int_0^\tau K d\epsilon\right) \alpha \Delta u(\tau) d\tau + e(0)\right]. \quad (42)$$

Knowing that $K\in \mathbb{R}^+$, $\Delta u(t)$ and $\theta(t)$ are bounded and $\alpha$ is fixed, it can be concluded that starting from any initial conditions $e(0)$, $$\lim_{t\to\infty} |e(t)| = 0, \quad (43)$$

i.e., the reference tracking is asymptotically achieved.

Evaluation Results

Figure 10A:
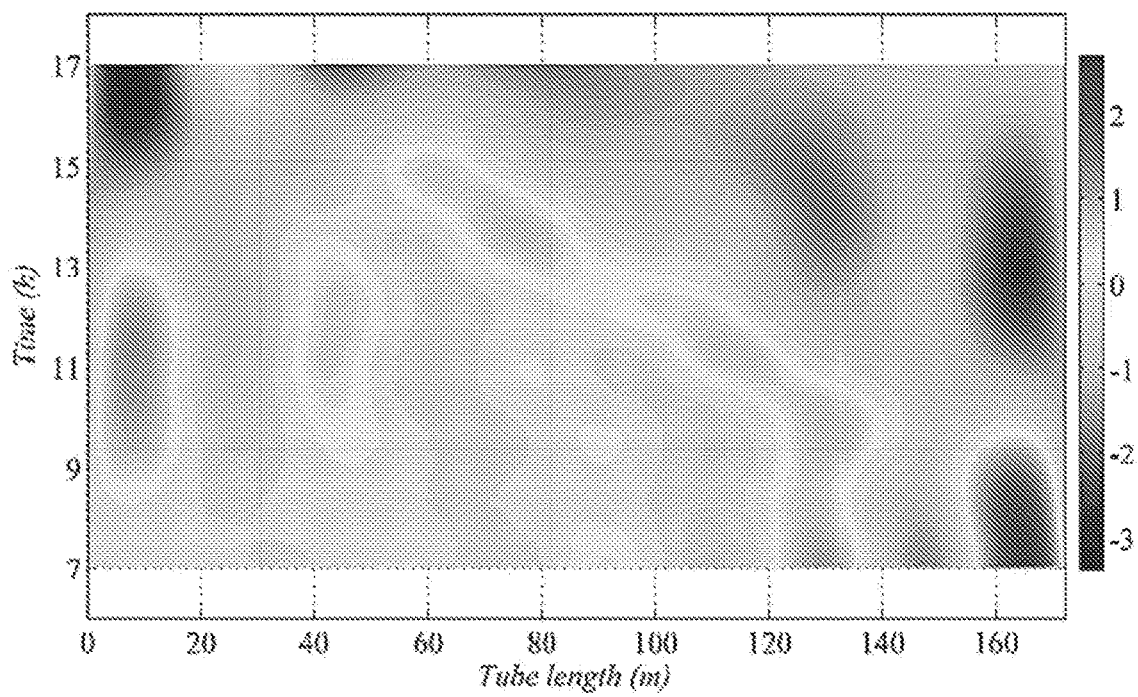
FIGS. 10A and 10B graphically illustrate examples of an inhomogeneous distribution of varying parameters in accordance with various embodiments of the present disclosure.
Figure 10B:
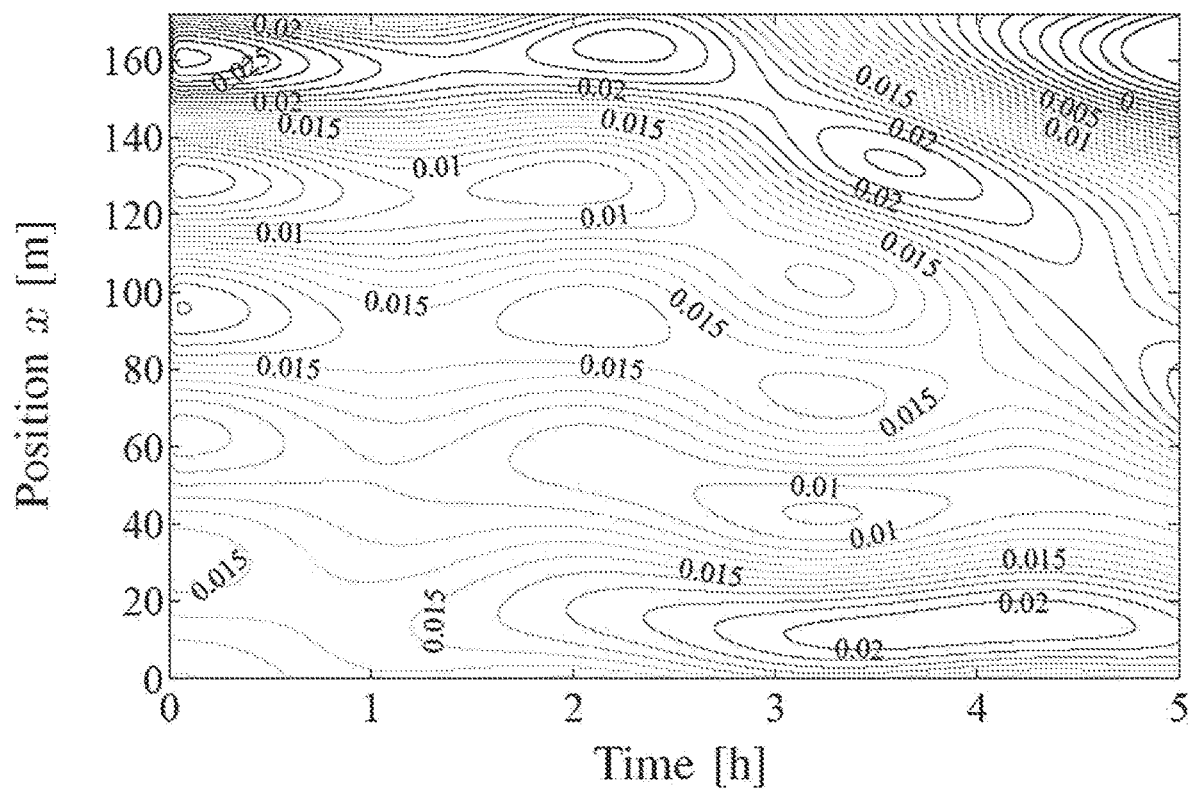
Figure 11A:
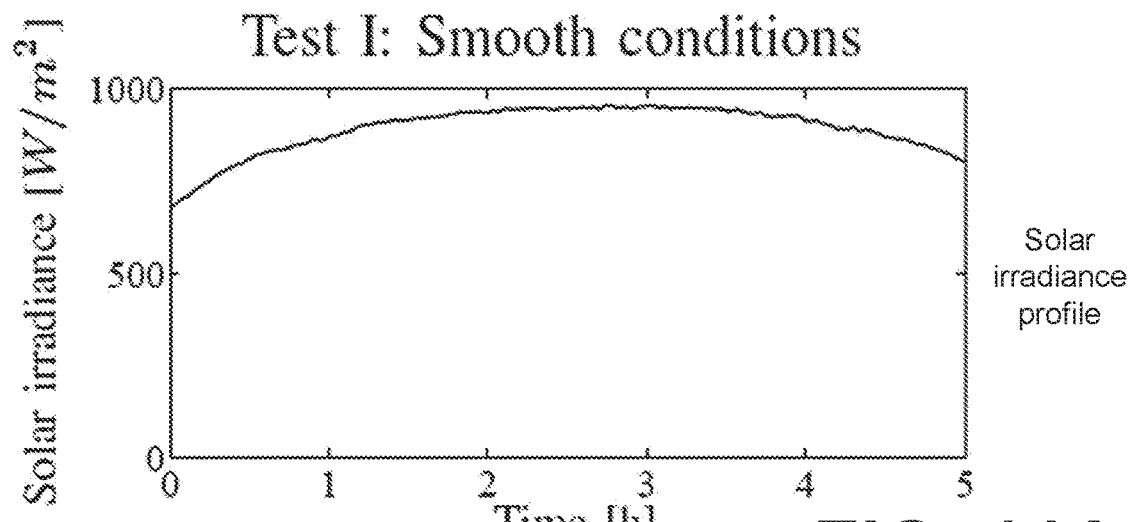
FIGS. 11A-11C, 12A-12C and 13A-13C illustrate examples of (a) solar irradiance, (b) reference tracking, and (c) control input for three tests of the robust controller of FIG. 9 in accordance with various embodiments of the present disclosure.
Figure 12A:
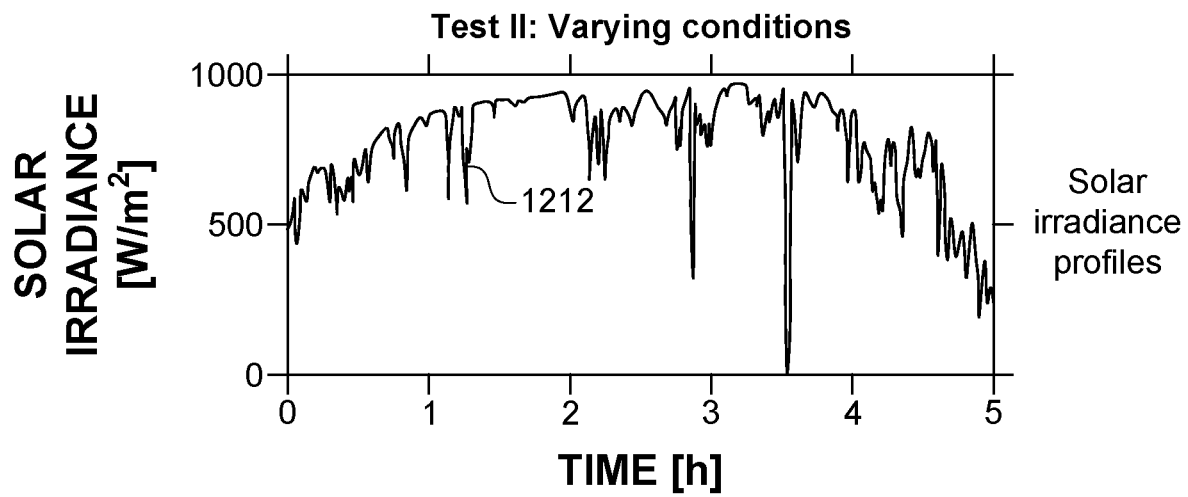
Figure 13A:
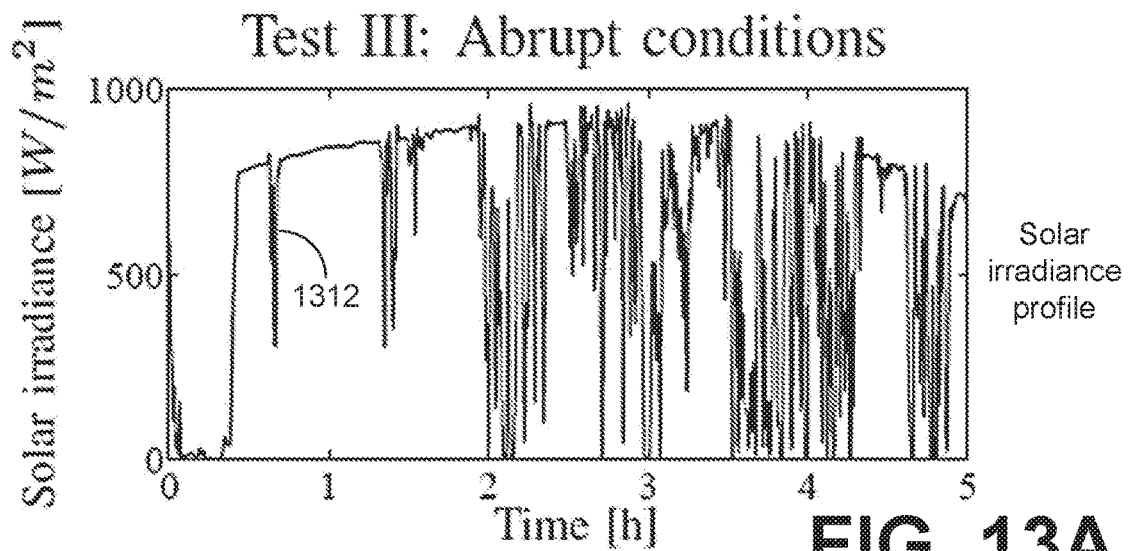

The parameters of the ACUREX field were considered for the numerical tests to evaluate the controller performance. The measured inlet temperature was provided as a boundary condition for the simulations. The time derivative of the sampled measured output using an algebraic estimator following equation (37), in order to update continuously F(t). Three different tests were carried out depending on the intensity profile of the sunlight striking the solar collector along 5 hours. The behavior of the controller was first tested under ideally selected circumstances considering a smooth irradiance profile. The second test was performed using a varying profile with some rapid changes in the disturbances. The third test was carried out under unfavorable radiation conditions in order to evaluate the controller performance under extreme conditions. To take into consideration the mirror's cleanness factor and the partial shading in the system, an inhomogeneous spatially distributed factor was multiplied by the time varying source term. FIG. 10A graphically illustrates an example of an inhomogeneous distribution of the varying parameters. A variable $\Delta_I(x, t)$ was defined and presented in FIG. 10B. The term $\Delta_I(x, t)$ is an inhomogeneous distribution in time and space that defines the percentage of inhomogeneity in space, such that:

$$s(x, t) = \frac{\nu G}{\rho c A_s}[I(t) + \Delta_I(x, t)I(t)], \quad (44)$$

where I(t) denotes the time varying profiles of FIGS. 11A, 12A and 13A. It is worth noting that a hysteresis control has been applied on the generated control input in order to keep the fluid flow rate within the admissible physical bounds. Indeed, lower fluid flow rates are undesirable in order to avoid the increase in the temperature of the thermal carrier fluid above the maximum recommended by the provider leading to its degradation.

Figure 9:
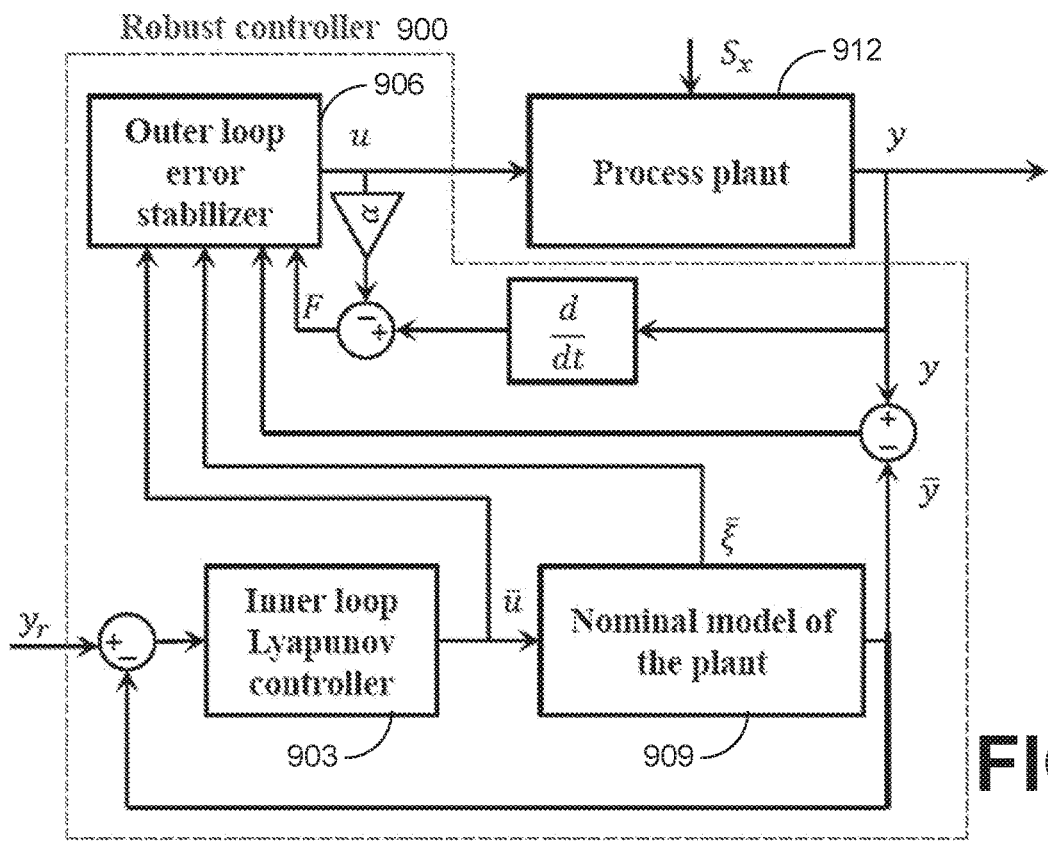
FIG. 9 is a schematic diagram of an example of a robust Lyapunov controller in accordance with various embodiments of the present disclosure.

The same configuration of the radial basis interpolation adopted previously for the model validation was again considered for these tests, where the generated outlet temperature is compared to the set point to evaluate the performance of the closed loop system of FIG. 9. FIGS. 11A-11C, 12A-12C and 13A-13C show examples of (a) solar irradiance, (b) reference tracking, and (c) control input for the first, second and third tests, respectively. Note that a hysteresis control has been applied on the generated control input in order to keep the fluid flow rate within the admissible physical bounds. Indeed, lower fluid flow rates are undesirable in order to avoid increasing the temperature of the thermal carrier fluid above the maximum recommended by the provider leading to its degradation. Moreover, the control is conditioned by the physical limitations of the actuator, the pump.

Moreover, the control is conditioned by the physical limitations of the actuator (e.g., the pump). The response time of the reference tracking closed loop can be managed by tuning the design parameter K (Lyapunov controller gain). Increasing the value of K makes the transient time faster. For these series of tests, the gain was chosen to be K=0.005 because different trials have shown that increasing this gain causes oscillations in the system response and might lead to instability and divergence of the output.

Figure 11B:
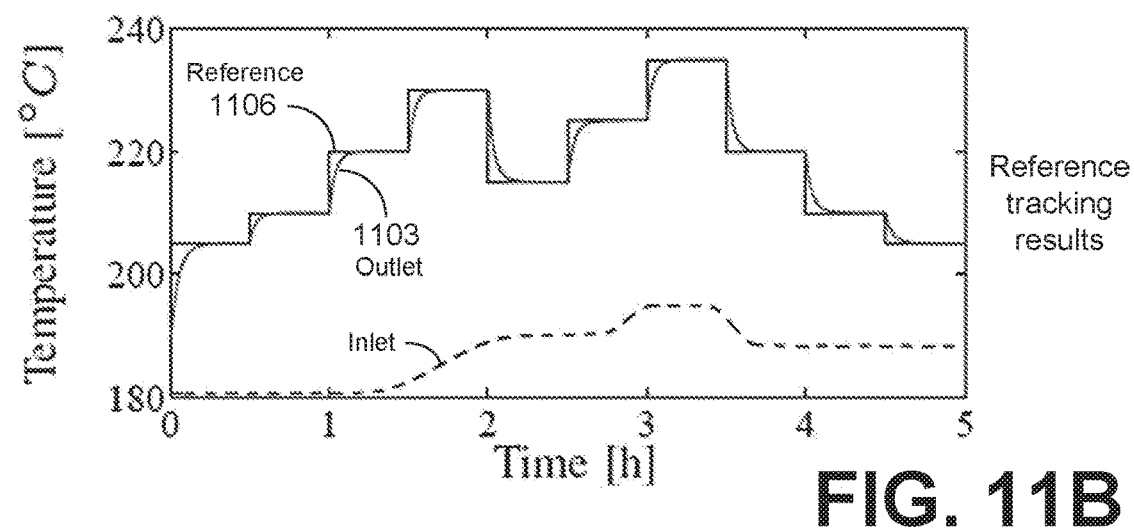
Figure 11C:
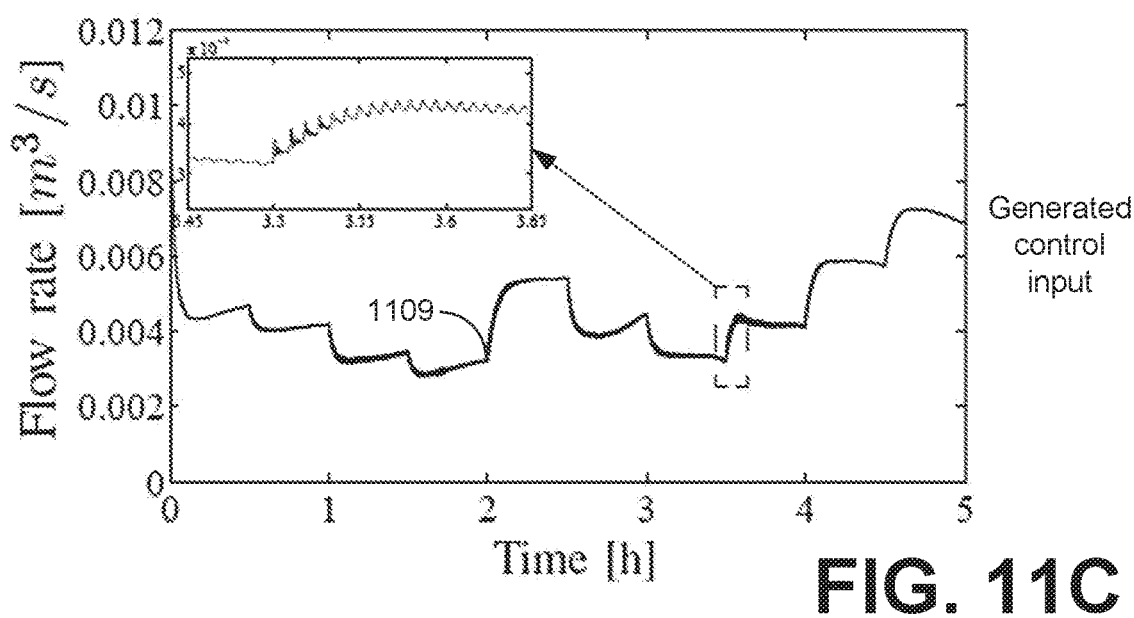

Referring to FIGS. 11A-11C, shown are results of the first test. It can be seen that the control objectives were achieved. Indeed, the robust control strategy was able to cope with external perturbations and to force the system outlet 1103 to follow the step variations in the reference 1106 without measuring or estimating the source term distribution affecting the plant. Moreover, the generated control input 1109 presented reasonable behavior and the changes with respect to the variations in the temperature reference 1106 can be clearly observed. The flow rate was decreased when an increasing step reference was injected and it was raised (increased) for a decreasing set temperature.

Figure 12B:
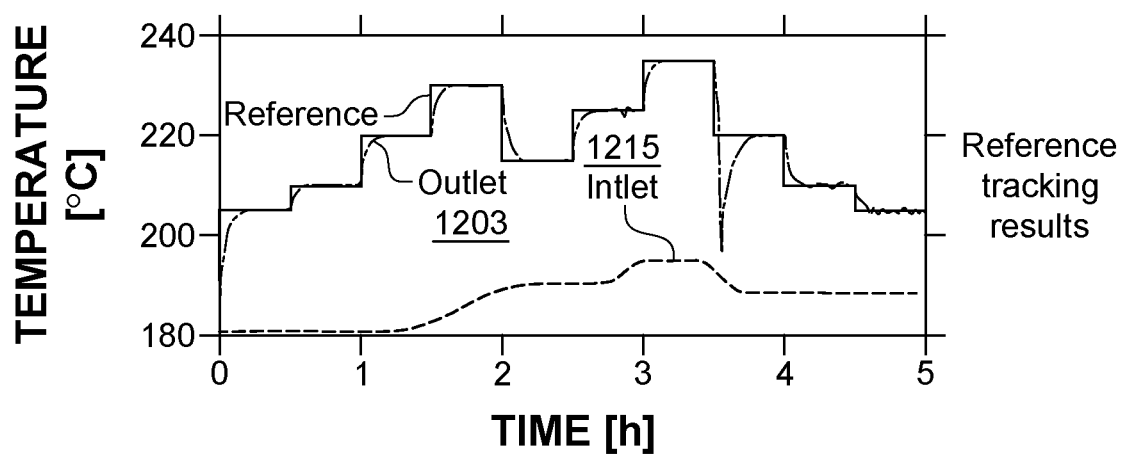
Figure 12C:
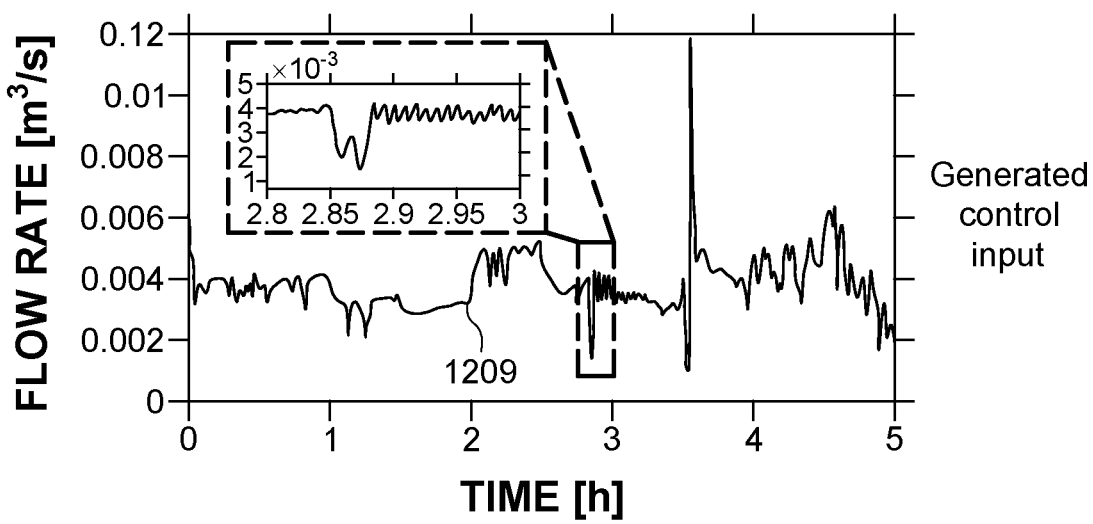

Referring next to FIGS. 12A-12C, shown are results of the second test. The efficiency of the robust controller 900 of FIG. 9 was proven in the second test where the irradiance profile 1212 was affected by small variations. The closed loop stability was maintained using a control input signal 1209 within the admissible limits except for a short time around 2 pm due to the low intensity of the sunlight. At that time the solar irradiance 1212 striking the system suddenly decreased to zero which stopped the thermal production.

Thereafter, it can be seen that the outlet temperature 1203 takes the value of the inlet temperature 1215 because the external thermal source is not available.

Figure 13B:
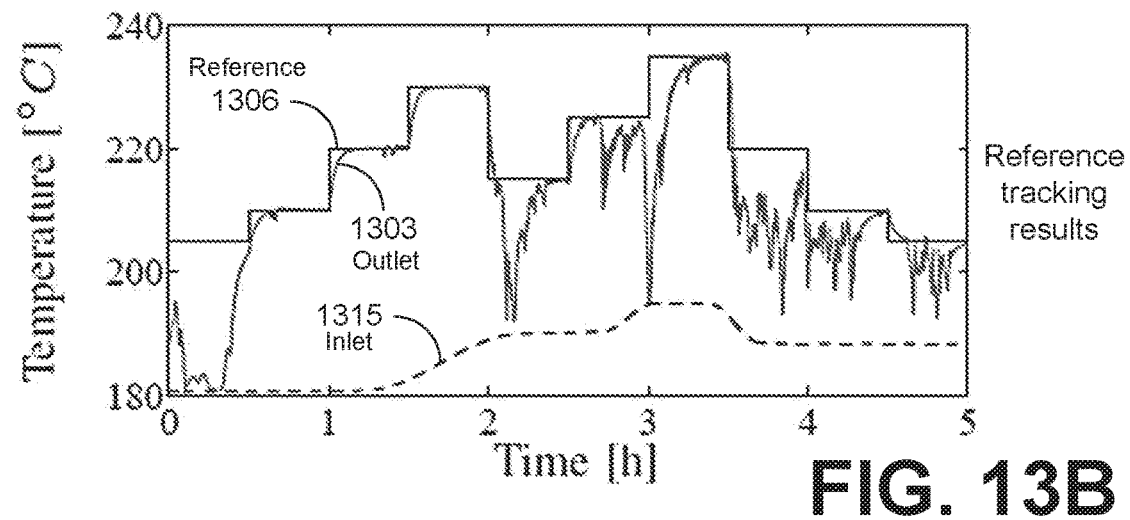
Figure 13C:
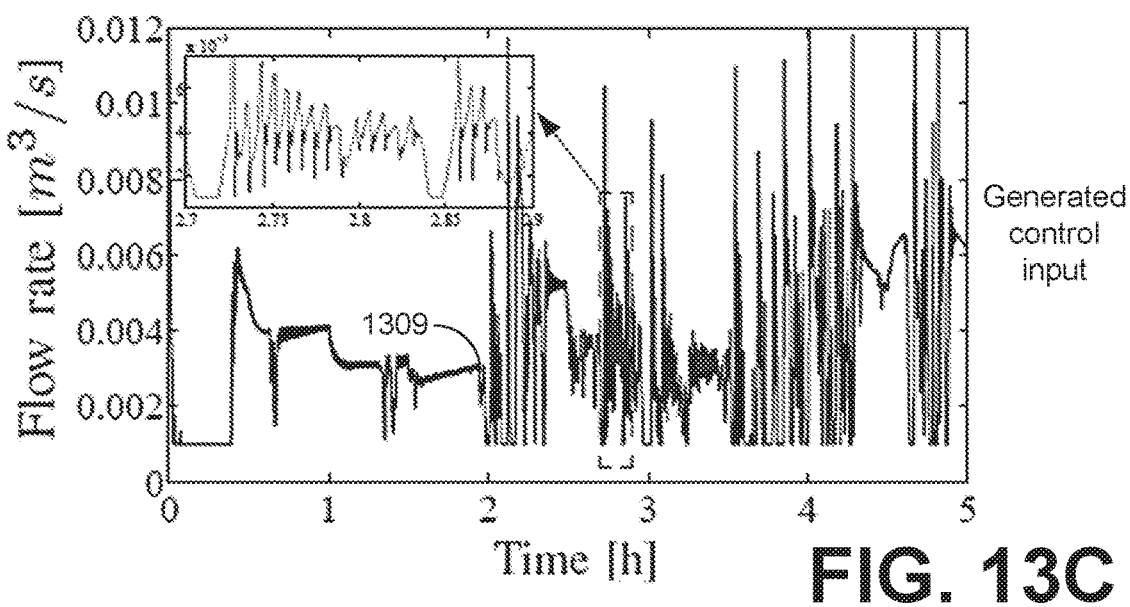

Referring now to FIGS. 13A-13C, shown are results of the third test. The system was tested under unfavorable circumstances with rapid variations in the intensity 1312. As it can be seen at the beginning of the test, for a zero irradiance, the outlet temperature 1303 takes the value of the inlet temperature 1315 and the system does not produce thermal energy. Furthermore, it can be observed that the controller of FIG. 9 was efficient in stabilizing the closed loop system trying to keep the outlet temperature 1303 around the desired reference value 1306 by compensating for the external disturbances. However, due to the fact that the control input 1309 was constrained by physical limitations, it was not possible to ensure the reference tracking for low intensities where the fluid flow rate was reduced to a minimum to keep the outlet temperature 1303 as high as possible and consequently close to the set point (reference) 1306.

Note that the error converges to zero bounded by 5° C. despite the changes in the working conditions without exact measurements or efficient estimation of these disturbances. In addition, the time response was evaluated to be between 5 and 10 minutes for reference step changes ranging between 10° C. and 15° C., which is very promising in real time implementation for thermal processes.

A robust controller 900 (FIG. 9) based on a low dimensional bilinear approximate model of the parabolic distributed collector was presented. The model used for the control design has been derived from the hyperbolic transport equation as a result of a dynamical Gaussian interpolation. It takes the form of a low dimensional state space representation reducing the computational effort and the design complexity while reproducing the heat transfer dynamics along the solar collector with satisfactory accuracy.

An efficient controller was found in order to maintain the field outlet temperature around a certain desired level by tuning the fluid velocity in the collector tube despite environmental changes. The robust control forces the trajectory of the system output to track a predefined reference despite the unknown and unmeasured random variations of the external disturbances affecting the thermal dynamics. The controller has been designed using a combination of a Lyapunov stabilizing state feedback and a phenomenological representation of the system. Several numerical tests have been performed to evaluate the performance of the control strategy under different levels and variations of the solar irradiance. The robust control performed well in terms of tracking error stabilization and closed loop time response, in addition to the robustness with the respect to the external disturbances and the uncertainty in the system parameters.

Figure 14:
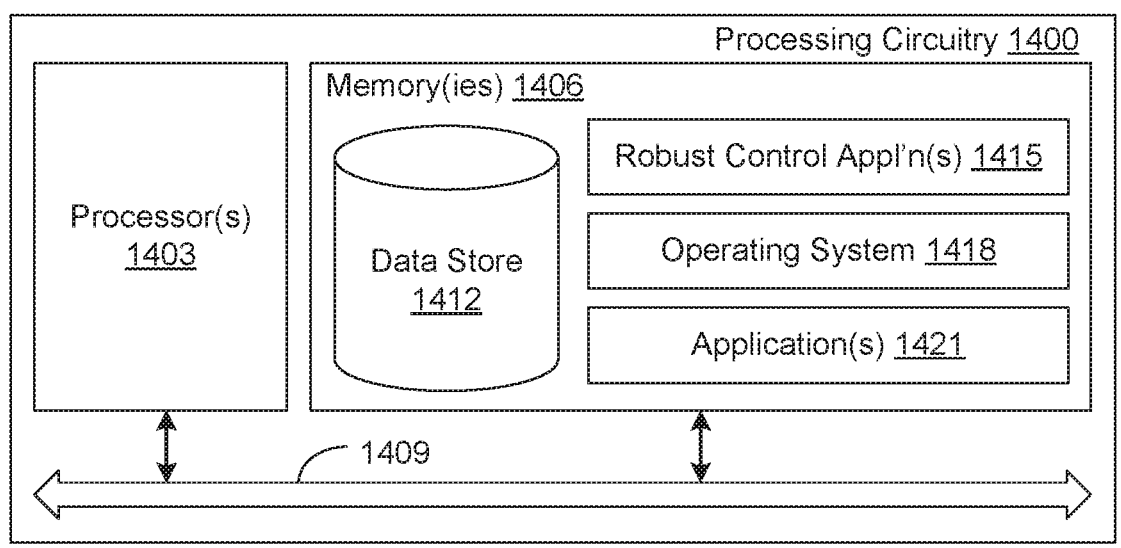
FIG. 14 is a schematic block diagram that illustrates an example of processing circuitry employed by the robust controller of FIG. 9 in accordance with various embodiments of the present disclosure.

With reference now to FIG. 14, shown is a schematic block diagram of an example of processing circuitry 1400 that may be used to implement various portions of the robust controller 900 of FIG. 9 in accordance with various embodiments of the present disclosure. The processing circuitry 1400 includes at least one processor circuit, for example, having a processor 1403 and a memory 1406, both of which are coupled to a local interface 1409. To this end, the processing circuitry 1400 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 1409 may comprise, for example, a data bus with an accompanying address/control bus or other bus structure as can be appreciated. The processing circuitry 1400 can include a display for rendering of generated graphics such as, e.g., a user interface and an input interface such, e.g., a keypad or touch screen to allow for user input. In addition, the processing circuitry 1400 can include communication interfaces (not shown) that allow the processing circuitry 1400 to communicatively couple with other communication devices. The communication interfaces may include one or more wireless connection(s) such as, e.g., Bluetooth or other radio frequency (RF) connection and/or one or more wired connection(s).

Stored in the memory 1406 are both data and several components that are executable by the processor 1403. In particular, stored in the memory 1406 and executable by the processor 1403 are robust control application(s) 1415, an operating system 1418, and/or other applications 1421. Robust control applications 1415 can include applications that support, e.g., controllers for control of the operation of uncertain systems such as, e.g., solar collectors and/or observers for estimation of states and/or characteristics of the uncertain systems. It is understood that there may be other applications that are stored in the memory 1406 and are executable by the processor 1403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, LabVIEW® or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the robust control application(s) 1415, the operating system 1418, application(s) 1421, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the robust control application(s) 1415 and/or application(s) 1421, that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A controller for controlling a process plant, the controller comprising:
   a processor; and
   a memory connected to the processor, wherein the processor is configured to control an input u of the process plant, and the processor includes (1) an inner closed loop Lyapunov controller, (2) a nominal model of the process plant, and (3) an outer closed loop error stabilizer,
   wherein the nominal model is a bilinear model that associates a nominal input $\bar{u}$ associated with the nominal model, with a state representation $\bar{\xi}$ and a nominal output $\bar{y}$ of the nominal model,
   wherein the outer closed loop error stabilizer receives (a) a compensation term F, which is calculated based on (i) a time derivative of an output y of the process plant, and (ii) the input u, and the compensation term F accounts for varying external disturbances acting on the process plant, (b) the nominal input $\bar{u}$, (c) the state representation $\bar{\xi}$, and (d) a difference between the output y and the nominal output $\bar{y}$,
   wherein the outer loop error stabilizer generates the input u based on the compensation term F, the nominal input $\bar{u}$, the state representation $\bar{\xi}$, and the difference between the output y and the nominal output $\bar{y}$, and
   wherein the inner loop Lyapunov controller uses a Lyapunov function V, which is a function of a tracking error e, which is defined as a difference between a reference output yr and the nominal output $\bar{y}$, and the inner loop Lyapunov controller calculates the nominal input $\bar{u}$.

2. The system of claim 1, further comprising:
   the process plant, which is a distributed solar collector and the input $\bar{u}$ of the process plant is an inlet fluid flow rate.

3. The system of claim 1, wherein the nominal model of the process plant is configured to generate the nominal output based at least in part upon fixed working conditions of the process plant.

4. The system of claim 3, wherein the nominal model describes the process plant.

5. The system of claim 4, wherein the bilinear model approximates the process plant by a low order nonlinear set of ordinary differential equations using dynamical Gaussian interpolation.

6. The system of claim 1, wherein the outer closed loop error stabilizer is configured to generate the input u to force the output y of the process plant to track the nominal output $\bar{y}$ using the compensation term F.

7. The system of claim 1, wherein the process plant comprises a parabolic solar collector.

8. A method for controlling a process plant, the method comprising:
monitoring an output y of the process plant;
generating, by an inner closed loop Lyapunov controller, a nominal control input $\bar{u}$ based at least in part upon a defined output reference yr;
generating, by a nominal model of the process plant, a nominal output $\bar{y}$ based on the nominal control input $\bar{u}$;
generating, by an outer closed loop error stabilizer, a control input u based at least in part upon the nominal control input $\bar{u}$ and a compensation term F, which accounts for varying external disturbances of the process plant; and
adjusting operation of the process plant based upon the control input u to force the output y of the process plant to track the defined output reference yr,
wherein the nominal model is a bilinear model that associates the nominal input $\bar{u}$ of the nominal model, with a state representation and the nominal output $\bar{y}$ of the nominal model,
wherein the outer closed loop error stabilizer receives (a) the compensation term F, which is calculated based on (i) a time derivative of the output y of the process plant, and (ii) the control input u, (b) the nominal control input $\bar{u}$, (c) the state representation $\bar{\xi}$, and (d) a difference between the output y and the nominal output $\bar{y}$,
wherein the outer loop error stabilizer generates the control input u based on the compensation term F, the nominal control input $\bar{u}$, the state representation $\bar{\xi}$, and the difference between the output y and the nominal output $\bar{y}$ and
wherein the inner loop Lyapunov controller uses a Lyapunov function V, which is a function of a tracking error e, which is defined as a difference between the defined output reference yr and the nominal output $\bar{y}$.

9. The method of claim 8, wherein the compensation term is determined based upon the control input and a rate of change of the output.

10. The method of claim 8, wherein the nominal model describes the process plant.

11. The system of claim 8, wherein the bilinear model approximates the process plant by a low order nonlinear set of ordinary differential equations using dynamical Gaussian interpolation.

12. The method of claim 8, wherein the control input u is further based upon time varying weighting parameters provided by the nominal model.

13. The method of claim 8, wherein the process plant is a distributed solar collector and the input of the process plant is an inlet fluid flow rate.

14. A system of a process plant, comprising:
processing circuitry including a processor and a memory, and
a local interface coupled to the processor and the memory,
wherein one or more control applications are stored in the memory and executable by the processor,
wherein the control applications support a controller configured to control an input u of the process plant,
wherein the controller includes (1) a nominal model of the process plant, (2) an inner closed loop Lyapunov controller, and (3) an outer closed loop error stabilizer,
wherein the nominal model includes a bilinear model that associates a nominal input $\bar{u}$ of the nominal model, with a state representation $\bar{\xi}$ and a nominal output $\bar{y}$ of the nominal model,
wherein the outer closed loop error stabilizer receives (a) a compensation term F, which is calculated based on (i) a time derivative of an output y of the process plant, and (ii) the input u, and the compensation term F accounts for varying external disturbances of the process plant, (b) the nominal input $\bar{u}$, (c) the state representation $\bar{\xi}$, and (d) a difference between the output y and the nominal output $\bar{y}$,
wherein the outer loop error stabilizer generates the input u based on the compensation term F, the nominal input $\bar{u}$, the state representation $\bar{\xi}$, and the difference between the output y and the nominal output $\bar{y}$, and
wherein the inner loop Lyapunov controller uses a Lyapunov function V, which is a function of a tracking error e, which is defined as a difference between a reference output yr and the nominal output $\bar{y}$, and the inner loop Lyapunov controller calculates the nominal input $\bar{u}$.

15. The system of claim 14, wherein the nominal model of the process plant is configured to generate the nominal output $\bar{y}$ based at least in part upon fixed working conditions of the process plant.

16. The system of claim 15, wherein the nominal model is associated with the process plant.

17. The system of claim 14, wherein the outer closed loop error stabilizer is configured to generate the input u to force the output y of the process plant to track the nominal output $\bar{y}$ using plant the compensation term F.

18. The system of claim 14, wherein the inner closed loop Lyapunov controller is configured to generate the nominal input $\bar{u}$, based upon the nominal output $\bar{y}$ generated by the nominal model of the process plant and the output reference yr, the nominal input $\bar{u}$ provided to the outer closed loop error stabilizer and the nominal model of the process plant.

* * * * *